(12) United States Patent
Lesczynski et al.

(10) Patent No.: US 6,428,723 B1
(45) Date of Patent: *Aug. 6, 2002

(54) METHOD AND APPARATUS FOR SEPARATING CONTACT LENS MOLD SECTIONS

(75) Inventors: Michael A. Lesczynski, Honeoye Falls, NY (US); Mingway B. Wu, Stanford, CA (US); Christopher Bentley, Farmington Hills, MI (US); Kevin D. Beebe, Spencerport, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/471,601

(22) Filed: Dec. 23, 1999

Related U.S. Application Data

(63) Continuation of application No. 08/964,169, filed on Nov. 4, 1997, now Pat. No. 6,033,603.
(60) Provisional application No. 60/030,565, filed on Nov. 6, 1996.

(51) Int. Cl.[7] .................................. B29D 11/00
(52) U.S. Cl. .................... 264/1.1; 264/334; 425/440; 425/808
(58) Field of Search .............. 264/1.1, 334, 2.2, 264/2.3, 1.36, 1.37, 1.38; 425/436 R, 440, 808

(56) References Cited

U.S. PATENT DOCUMENTS

| | | | |
|---|---|---|---|
| 4,155,962 A | 5/1979 | Neefe | 264/334 |
| 4,197,266 A | 4/1980 | Clark et al. | 264/1 |
| 4,208,364 A | 6/1980 | Shepherd | 264/1 |
| 4,865,779 A | 9/1989 | Ihn et al. | 264/1.1 |
| 4,909,969 A | 3/1990 | Wood | 264/2.3 |
| 4,955,580 A | 9/1990 | Seden et al. | 249/82 |
| 5,143,660 A | 9/1992 | Hamilton | 264/1.4 |
| 5,264,161 A | 11/1993 | Druskis | 264/2.6 |
| 5,271,875 A | 12/1993 | Appleton | 264/2.3 |
| 5,693,268 A | 12/1997 | Widman et al. | 264/334 |
| 5,850,107 A | * 12/1998 | Kindt-Larsen et al. | 264/1.1 |
| 6,033,603 A | * 3/2000 | Lesczynski et al. | 264/1.1 |

FOREIGN PATENT DOCUMENTS

| | | | |
|---|---|---|---|
| EP | 0227365 | 7/1987 | B29D/11/00 |
| EP | 0637490 | 7/1994 | B29C/35/08 |
| EP | 0686490 | 6/1995 | B29D/11/00 |
| EP | 0686487 | 12/1995 | B29D/11/00 |
| WO | 93/04834 | 3/1993 | B29C/33/62 |
| WO | 93/04848 | 3/1993 | B29D/11/00 |

* cited by examiner

Primary Examiner—Mathieu D. Vargot
(74) Attorney, Agent, or Firm—John E. Thomas

(57) ABSTRACT

A method for separating one mold section from another mold section and a contact lens molded in the two mold sections provides improved reliability that the lens is not damaged during this operation and that the lens is retained selectively on the desired. Various embodiments of apparatus for carrying out the method are disclosed.

7 Claims, 5 Drawing Sheets

METHOD AND APPARATUS FOR SEPARATING CONTACT LENS MOLD SECTIONS

This application is a continuation of U.S. application Ser. No. 08/964,169 filed Nov. 4, 1997 (now U.S. Pat. Ser. No. 6,033,603), which claims priority under 35 USC 119(e) of prior provisional application Ser. No. 60/030,565 filed Nov. 6, 1996.

BACKGROUND OF THE INVENTION

Static cast molding of contact lenses involves casting a contact lens in a mold cavity formed by two mold sections, an anterior mold section including a molding surface for forming the anterior lens surface and a posterior mold section including a molding surface for forming the posterior lens surface. Representative static cast molding methods are disclosed in U.S. Pat. No. 5,271,875 (Appleton et al.), U.S. Pat. No. 4,197,266 (Clark et al.), U.S. Pat. No. 4,208,364 (Shepherd), U.S. Pat. No. 4,865,779 (Ihn et al.), U.S. Pat. No. 4,955,580 (Seden et al.), and U.S. Pat. No. 5,143,660 (Hamilton et al.).

Following casting of the lens, the mold assembly is disassembled and the lens is removed from the mold assembly.

One approach for recovering the contact lens involves exposing the entire mold assembly, including the two mold sections and the molded lens therebetween, to an aqueous solution (including water alone). Hydrophilic lenses absorb water to form a hydrogel, and when the lens absorbs water, it swells and is released from both the posterior and anterior molding surfaces of the respective molds. Often, the aqueous solution may also facilitate separation of the two mold sections from each other. The lens can then either be separated from the mold sections, either manually or with automated handling equipment. Representative "wet release" methods are discussed in U.S. Pat. No. 5,264,161 (Druskis et al.).

A second approach involves, initially, a "decapping" step, i.e., separating one mold section from the second mold section with the lens being retained in the second mold section. Then, the lens is removed (or released) from the second mold section, either by exposure to an aqueous solution (wet release) whereby the lens absorbs water to facilitate its separation from the molding surface of the mold section, or by simply removing the lens from the second mold section without the use of an aqueous solution (dry release).

Although the decapping and release operations may seem straightforward, various problems have been encountered. This is especially true for cast molding methods where the molding operation results in the two mold sections being held tightly together, or where the lens has a tendency to stick to one or both molding surfaces of the mold sections. For example, when the first mold section is decapped from the second mold section with the lens being retained in the second mold section, the surface of the lens may be damaged as pieces of lens stick to the first mold section. Also, since the lens has not yet been hydrated, it is brittle, and the decapping operation can fracture the lens.

As another example of problems encountered, it is often desirable that the lens is selectively retained in a desired mold section to minimize manual handling or inspection. However, the decapping process can result in the lens not being retained in the desired mold section as intended, thus requiring manual handling or inspection to ensure that the lens is not discarded with the mold section removed in the decapping process. Various approaches for selective retention of the lens in a desired mold section have been proposed. U.S. Pat. No. 5,271,875 (Appleton et al.) discloses using mold sections made of different materials, however, this complicates the injection molding process. It is also known to treat one of the mold surfaces with plasma treatment to facilitate selective retention of the lens, however, this process adds additional steps and cost to the overall molding process.

Consider the case where it is desired to retain the molded lens on the anterior mold. A decapping operation of which applicant is aware involves decapping the posterior mold (i.e., separating the posterior mold from the anterior mold and molded lens) by holding the anterior mold firmly (for example, in a collet), followed by pulling the posterior mold or by pushing the posterior mold from the anterior mold (for example, with collet fingers). Applicant has found that this approach provides some success, however, yield is not entirely satisfactory due to damage to lenses during the decapping step, or lenses not being retained with the anterior mold as intended. Another approach would involve decapping the posterior mold by holding the posterior mold, followed by applying pressure to the anterior mold to separate the anterior mold and the lens from the posterior mold. However, this approach is less successful than the aforementioned approach in that there is a higher rate of lens damage and/or occurrence of the lens not being retained in the anterior mold.

The operations are further complicated by the fact that many static cast molding methods result in a ring of cured excess lens material being obtained in addition to the molded lens. Thus, while it is generally desirable that the lens is selectively retained in one desired mold section, as discussed above, it is often also desirable that the ring of cured excess lens material be selectively retained on the other mold section.

SUMMARY OF THE INVENTION

The invention provides a method that includes a decapping operation to separate one mold section from a second mold section and a contact lens. The method provides improved reliability that the lens is retained selectively on the second mold section as intended. Additionally, the potential for damage to the lens during decapping is reduced. Accordingly, yield can be increased while minimizing manual handling or inspection.

According to a first embodiment, the method comprises: disengaging the first mold section from the second mold section and contact lens by applying a force to the first mold section in a manner that moves the first mold section away from the contact lens surface and the second mold section while minimizing stresses at an interface of the second mold section molding surface and a contact lens surface in contact therewith, and separating the first mold section from the second mold section with the contact lens being retained in the second mold section.

According to a second embodiment, the method comprises: applying a force to a peripheral region of the first mold section whereby a peripheral region of the first mold section molding surface is first separated from the contact lens surface followed by a central region of the first mold section molding surface being separated from the contact lens surface; and separating the first mold section from the second mold section with the contact lens being retained in the second mold section.

According to preferred embodiments, the lens is retained selectively on a molding surface of the anterior mold section, and a ring of cured excess lens material is removed with the posterior mold section.

The decapping operation may be followed by a dry release operation to release the lens from the second mold section, whereby the lens is recovered in a dry state for post-release processing.

The decapping operation minimizes manual handling of the lens and mold sections. The invention obviates the need for pre-molding operations to facilitate decapping or selective retention of the lens on a desired mold section, such as pretreatment of the mold surfaces, and the invention obviates post-mold operations to assist in decapping, such as application of heat or chemical treatments to the mold assembly.

Additionally, the invention provides apparatus for carrying out the methods of the invention.

DETAILED DESCRIPTION OF PREFERRED EMBODIMENTS

Figure 1:
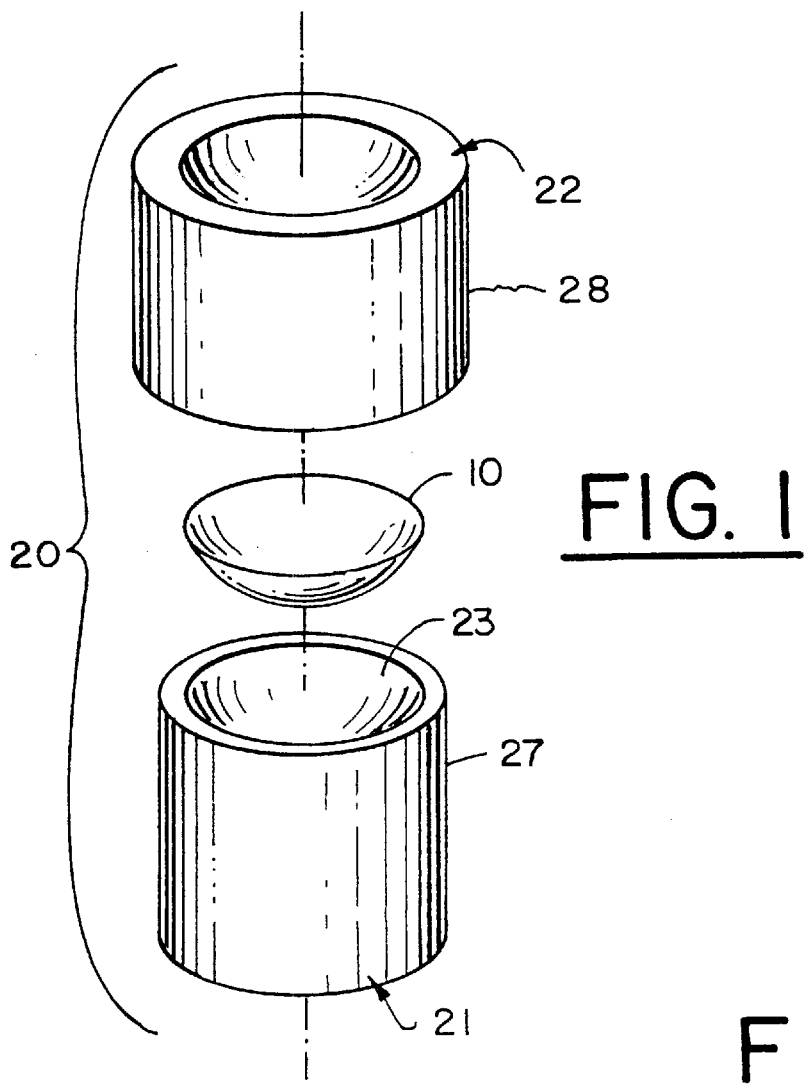
FIG. 1 is a schematic exploded view of a representative mold section assembly for use in the invention.
Figure 2:
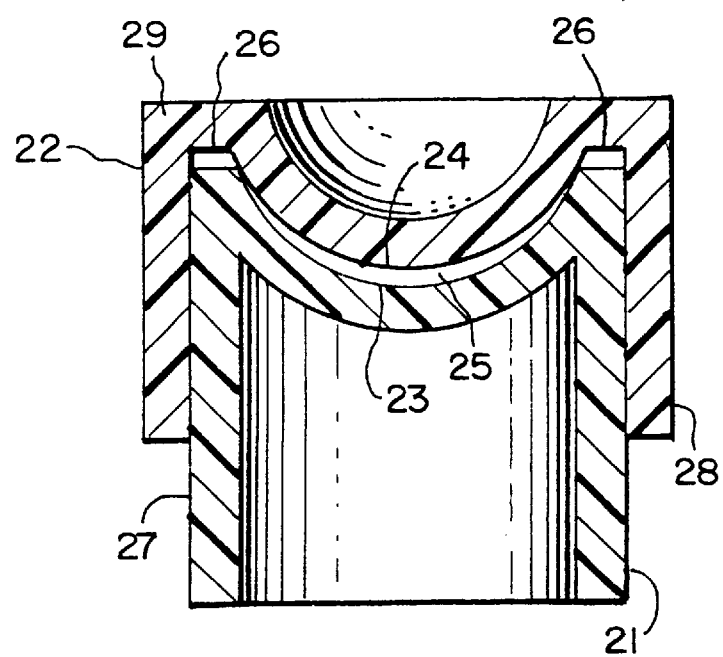
FIG. 2 is a schematic cross-sectional view of an assembled mold assembly.

FIGS. 1 and 2 schematically illustrate a representative mold assembly for use in the method and apparatus of the present invention.

Mold assembly 20 includes anterior mold section 21 and posterior mold section 22. When mold sections 21 and 22 are assembled, anterior molding surface 23 (which forms the anterior surface of molded lens 10) and posterior molding surface 24 (which forms the posterior surface of molded lens 10) define a molding cavity 25. For the illustrated mold assembly, mold sections 21 and 22 include respective cylindrical walls 27, 28 that nest when the mold sections are fully assembled.

According to conventional cast molding methods, mold sections 21 and 22 are first injection molded from a plastic resin in an injection molding apparatus. A curable lens material, such as a liquid polymerizable monomer mixture, is introduced into anterior molding surface 23, mold sections 21 and 22 are brought into close association with the liquid being compressed to fill molding cavity 25, and the monomer mixture is cured into a contact lens. Frequently, a reservoir is provided for receiving excess lens material when the mold sections are brought together. For the illustrated mold assembly, reservoir 26 receives excess lens material; when the lens is cured, the excess lens material is cured also to form a ring-like shape.

As discussed above, following casting of the lens, the mold assembly is disassembled and the lens is removed from the mold assembly for further processing and/or packaging.

Figure 3:
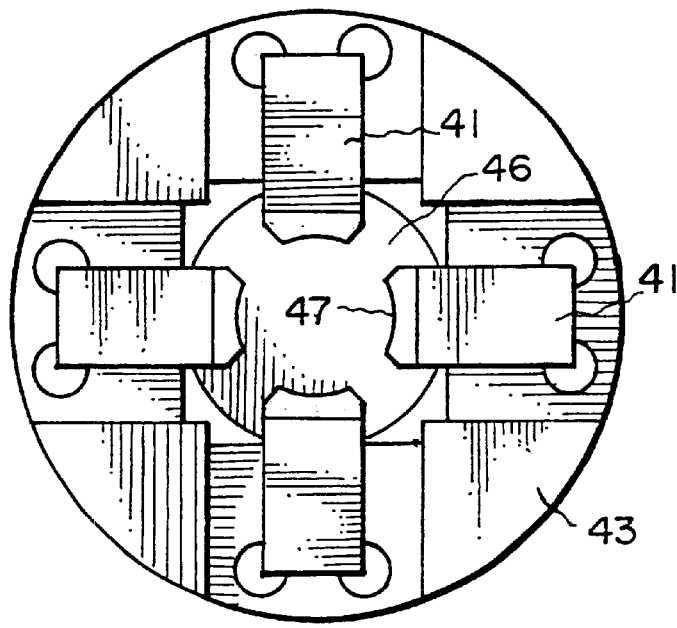
FIG. 3 is a top perspective view of an apparatus according to a first embodiment of the invention.
Figure 4:
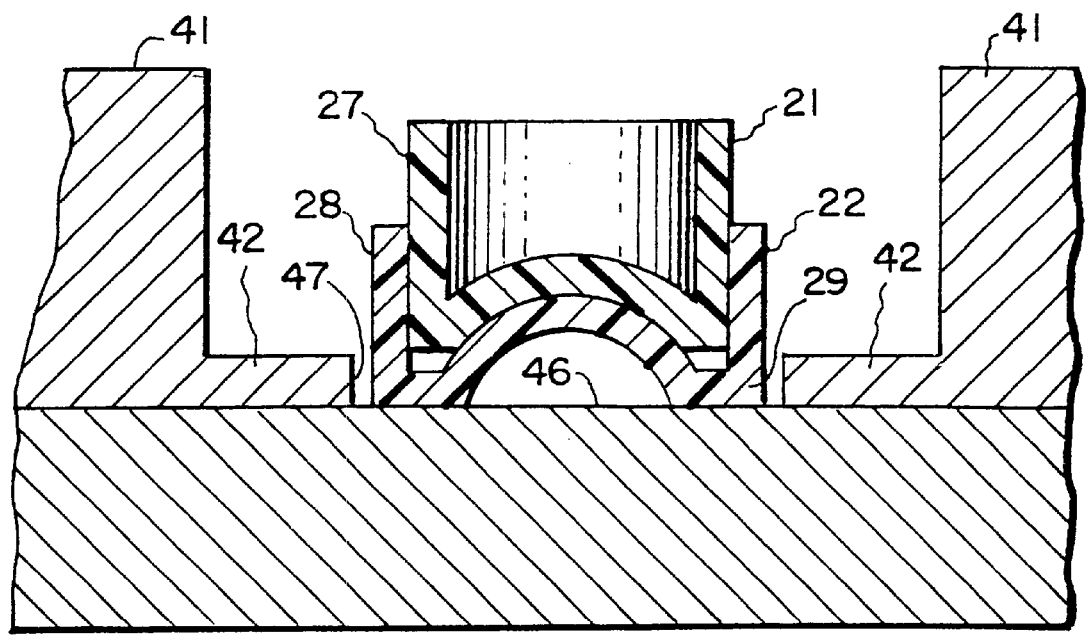
FIG. 4 is a partial cross-sectional view of the apparatus shown in FIG. 3 and a mold assembly.

FIGS. 3 and 4 illustrate one embodiment of an apparatus for carrying out the decapping operation, FIG. 4 being a partial cross-sectional schematic view of the apparatus shown in FIG. 3. The apparatus includes clamps 41 for applying forces to a peripheral region of posterior mold; for the illustrated mold assembly, portion 42 of clamps 41 contact a peripheral region of upper flange 29 that extends above the molding surface of posterior mold 22. Clamps 41 are supported by support 43 that includes surface 46 for supporting mold assemblies, such that clamps 41 are arranged radially with respect to a mold assembly received in the apparatus and supported on surface 46. Preferably, the surfaces 47 of the clamps that contact the posterior mold are contoured to correspond with the outer surface of the posterior mold, as better illustrated in FIG. 3. Also, it is preferred that when surfaces 47 are engaged with the posterior mold, at least half of the perimeter of the outer posterior mold surface makes contact with surfaces 47 in order to ensure that forces are applied relatively uniformly about the perimeter of the posterior mold.

In operation, after a mold assembly is placed on surface 46, clamps 41 are actuated by actuating means, such as piston and cylinder actuators (not shown), to effect clamping of the posterior mold, thereby applying radial forces about a peripheral region of flange 29.

Figure 5A:
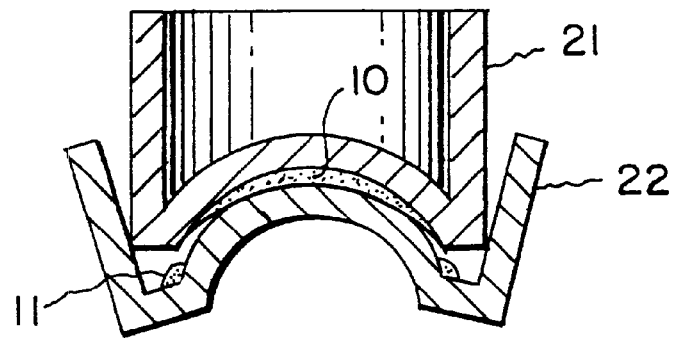
FIGS. 5a to 5c illustrate schematically the mold assembly during the decapping operation.
Figure 5B:
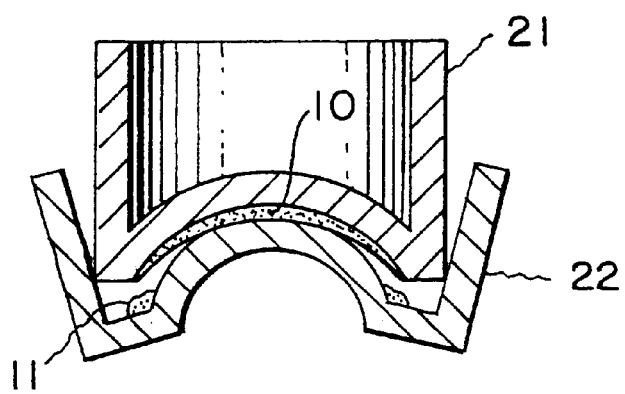
Figure 5C:
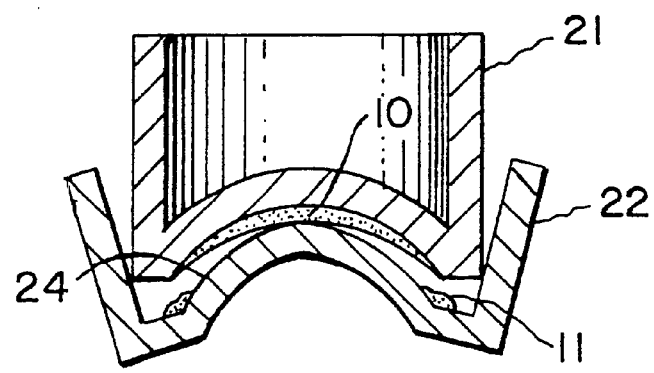

FIGS. 5a to 5c sequentially and schematically illustrate the desired effect of the clamping action on the posterior mold. The decapping operation separates the anterior mold from the posterior mold in a manner that the periphery of molding surface 24 is first separated from the surface of contact lens 10 in contact therewith, followed by central region of molding surface 24 being separated from the surface of contact lens 10. In other words, the molding surface of posterior mold surface is peeled from the anterior mold and contact lens, beginning at the periphery and then inwardly towards the center. At this point in the manufacturing process, the contact lens is in a dry state, and this action ensures that damage to the contact lens is minimized, due to fracturing the lens or pieces of the lens sticking to the posterior molding surface. This action also ensures that the contact lens remains retained on the anterior mold section as intended. As pointed out above, the clamping forces should be applied relatively uniformly about the perimeter of the posterior mold to facilitate this peeling action.

With reference to FIG. 4, the clamping force is applied to the peripheral region of posterior mold 22, a region remote from molding surface 23. Also, anterior mold section and the contact lens retained therein remain free to move away from the posterior mold section as the clamping force is applied. This ensures that stresses are minimized at an interface of the anterior mold section molding surface 23 and the surface of contact lens 10 in contact therewith. It has been found that when stresses are introduced at this interface, higher incidence of the lens not being retained with the anterior mold section 21 occurs.

After the decapping operation is complete, the anterior mold and contact lens can be recovered, such as with a pick-up mechanism, for further processing. Generally, further processing will include disengaging the contact lens from the anterior mold, which may include applying a force to the anterior mold section to assist in disengaging the contact lens. The recovered lens will generally be hydrated, sterilized and packaged. The posterior mold, and any ring of excess cured lens material 11, can be discarded.

Figure 6:
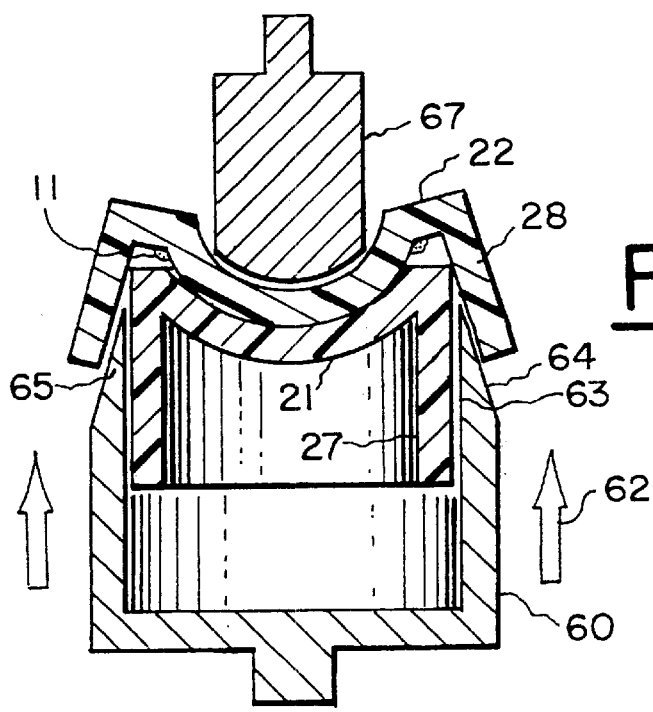
FIG. 6 is a cross-sectional view of an apparatus according to a second embodiment of the invention and a mold assembly.

FIG. 6 illustrates schematically another embodiment of an apparatus for carrying out the decapping operation.

The apparatus includes a wedge 60, the bottom of which may be inserted in an actuator (not shown), that is movable in a direction indicated by numeral 62 and axially aligned with a central axes of mold sections 21, 22. Wedge 60 includes an inner surface 63 and an outer surface 64, surfaces 63 and 64 meeting to form a tapered wedge-shaped tip 65. For the illustrated mold assembly, tip 65 is inserted between cylindrical wall sections 27, 28, in a region peripheral to the molding surfaces of the mold sections. Accordingly, inner surface 63 contacts an outer surface of cylindrical wall section 27, and outer surface 64 contacts an inner surface of cylindrical wall section 28. It is preferred that inner surface 63 substantially corresponds to the surface of cylindrical wall section 28; in this manner, wedge 60 assists in stabilizing anterior mold section 21 against forces exerted as the wedge is moved against posterior mold section 22. However, inner surface 63 should not fit too tightly against the contacting surface of anterior mold section 21 so that mold section 21 has freedom to move away from posterior mold section.

The apparatus can further include a pin 67 for insertion in a support that can remain stationary during the decapping operation. Accordingly, as tip 65 exerts the force to a peripheral region of the posterior mold section, along the direction aligned axially with central axes of the mold sections, pin 67 exerts a counteractive force in an opposite direction. In this manner, the decapping operation results in an effect similar to that illustrated in FIGS. 5a to 5c and discussed above. Following decapping, the posterior mold can be removed with a pick-up mechanism and discarded; it has been found that the ring of excess cured lens material 11 will generally remain with the posterior mold. The anterior mold and lens can be recovered for further processing.

Figure 7:
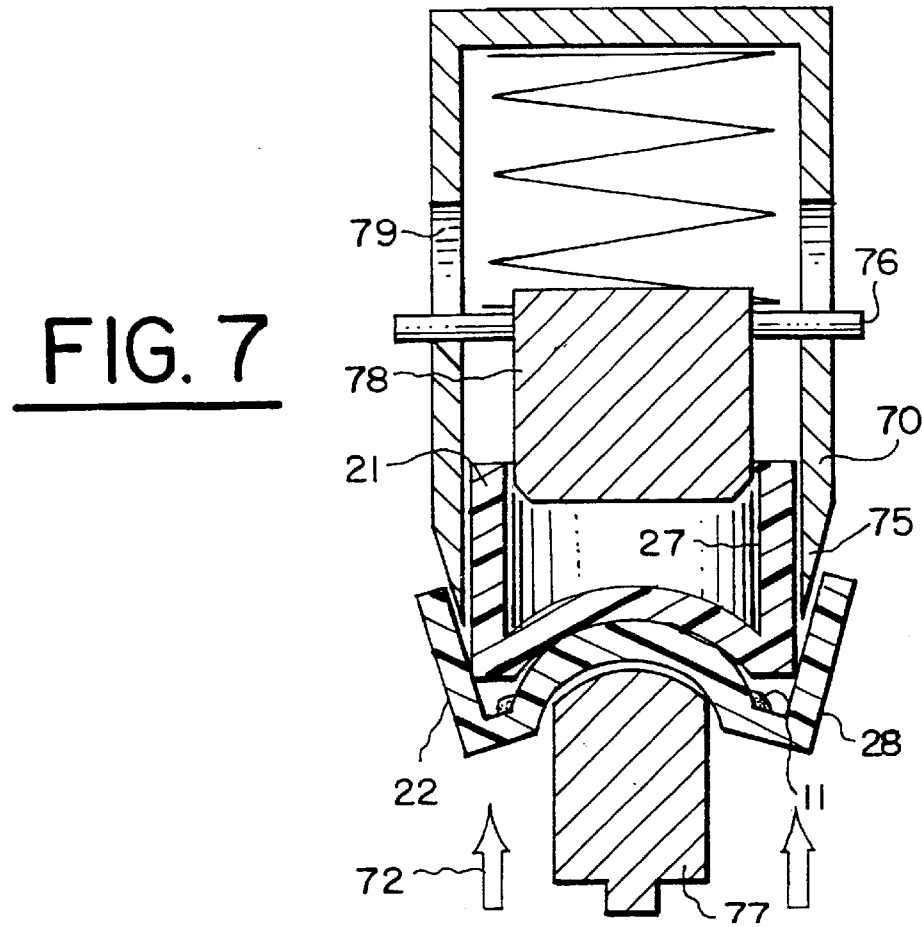
FIG. 7 is a cross-sectional view of an apparatus according to a third embodiment of the invention and a mold assembly.

FIG. 7 illustrates schematically another embodiment of an apparatus for carrying out the decapping operation. This apparatus includes a wedge 70 having tip 75 and that is generally similar in structure to wedge 60. During the decapping operation, wedge 70 may remain stationary, whereas pin 77 is movable along the direction shown by numeral 72 and aligned with a central axis of the mold sections, so as to force tip 75 between cylindrical wall sections 27, 28. Again, the decapping operation results in an effect similar to that illustrated in FIGS. 5a to 5c and discussed above.

This embodiment further includes a stabilizing plunger 78 which serves to further stabilize anterior mold 21 against forces exerted as the wedge is moved against posterior mold section 22. Plunger 78 includes dowel 76 that is received in slot 79 of wedge 70. Plunger 78 may be spring-biased with respect to wedge 70, as schematically illustrated in FIG. 7. However, it is preferred that plunger 78 does not contact surface 30 (opposed to molding surface 23) of mold section 27 surface during the decapping operation so that the interface between the molding surface of anterior mold section 27 and the contact lens is not disturbed.

One advantage of inverting the mold assembly as shown in FIG. 7, in contrast to the arrangement in FIG. 6, is that if the ring of excess cured lens material is not consistently retained on posterior mold, it will still drop away from the anterior mold and contact lens along with the posterior mold section.

Figure 8:
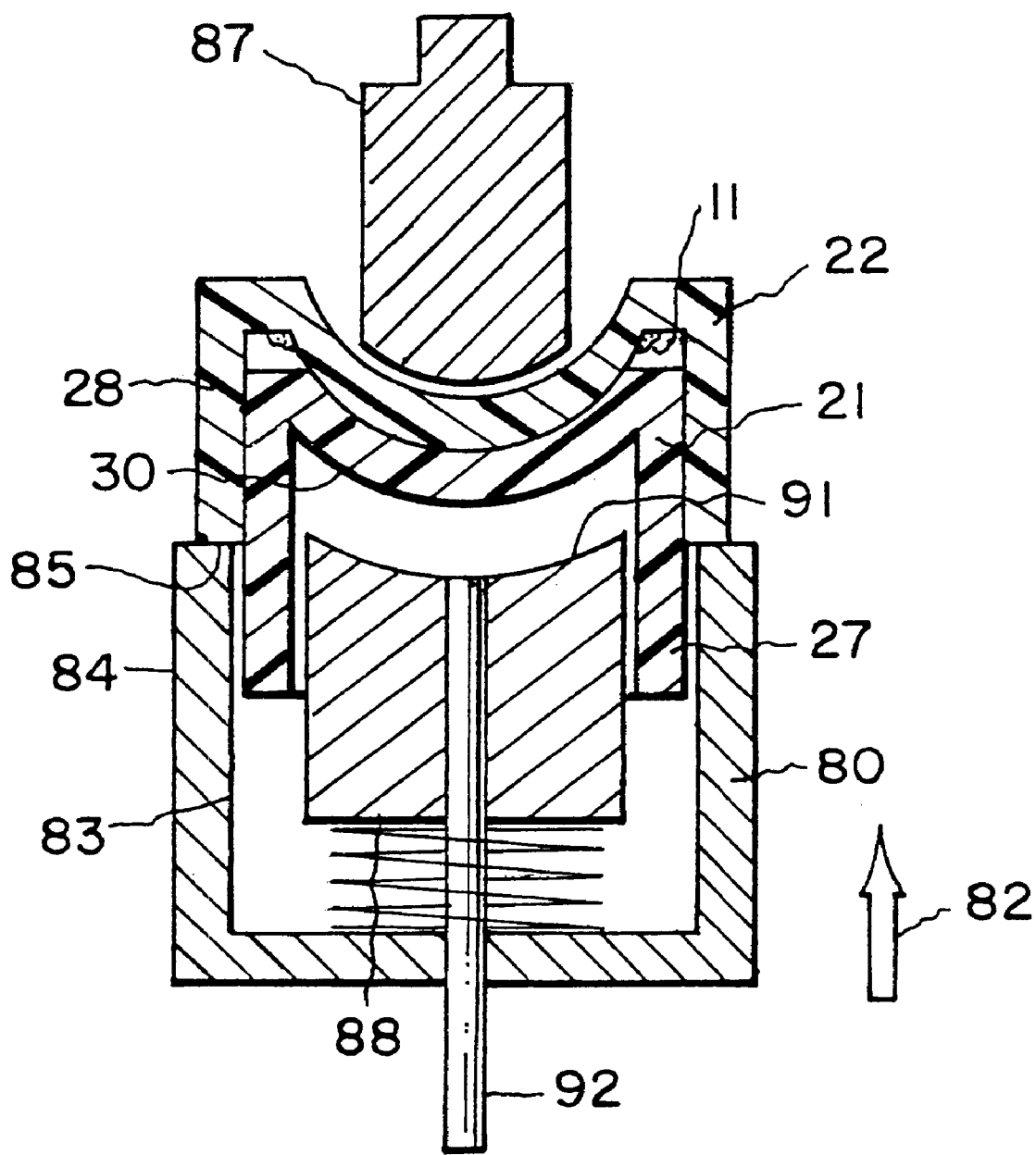
FIG. 8 is a cross-sectional view of an apparatus according to a fourth embodiment of the invention and a mold assembly.

FIG. 8 illustrates schematically yet another embodiment of an apparatus for carrying out the decapping operation.

The apparatus includes a hollow cylindrical member 80 that is movable in a direction indicated by numeral 82 and axially aligned with a central axes of mold sections 21, 22. Hollow cylindrical member 80 includes. an inner surface 83 and an outer surface 84, surfaces 83 and 84 terminated at annular surface 85. For the illustrated mold assembly, surface 85 contacts the bottom periphery of cylindrical wall section 28. Preferably, inner surface 83 has a diameter that substantially corresponds to the outer surface of cylindrical wall section 27; in this manner, hollow cylindrical member 80 can assist in stabilizing anterior mold section 21 against forces exerted as the hollow cylindrical member is moved against the bottom end of posterior mold section 22. However, inner surface 83 should not fit too snug against the contacting surface of anterior mold section 21 so that mold section 21 has freedom to move away from posterior mold section.

The apparatus further includes pin 87 that can remain stationary during the decapping operation. Accordingly, as surface 85 exerts force to bottom periphery of the posterior mold section, pin 87 exerts a counteractive force in an opposite direction. In this manner, the decapping operation results in an effect similar to that illustrated in FIGS. 5a to 5c.

FIG. 8 also illustrates an alternate embodiment of a stabilizing plunger that stabilizes the anterior mold as forces are exerted on the posterior mold. As shown in FIG. 8, upper surface 91 of plunger 88 is shaped to substantially correspond to surface 30 (opposed to molding surface 23) of mold section 27, and plunger 88 may include a vacuum line 92, extending through a central bore in the plunger, connected to vacuum means (not shown). Plunger 88 may be spring-biased with respect to cylindrical member 80 as schematically illustrated in FIG. 8. In operation, as cylindrical member 80 is moved towards the mold assembly, surface 91 of plunger 88 is brought into contact with surface 30, and suction is provided through line 92 to stabilize further anterior mold 27 during the decapping operation.

Various embodiments of the present invention are evident. Although FIGS. 1 and 2 have been included to illustrate a representative mold assembly for use in the invention, the invention is in no way limited to this specific mold assembly. A person of ordinary skill in the art can readily determine other mold assemblies for which the invention has applicability, or determine other embodiments of apparatus for carrying out the invention.

We claim:

1. A method of separating a first mold section from a second mold section and a contact lens molded therein, where molding surfaces of the mold sections are in contact with surfaces of the contact lens, said method comprising:

applying forces to and around a circumferential peripheral region of the first mold section whereby the first mold section molding surface is first separated from the contact lens surface around the periphery thereof and then inwardly towards a central region thereof, the forces being applied radially with respect to a central axis of the first mold section; and separating the first mold section from the second mold section with the contact lens being retained in the second mold section.

2. The method of claim 1, wherein the forces are applied by clamping the peripheral region of the first mold section.

3. The method of claim 1, wherein the first mold section is a posterior mold for molding a posterior lens surface and the second mold section is an anterior mold for molding an anterior lens surface.

4. The method of claim 1, wherein when the first and second mold sections are separated, a ring of excess cured lens material is removed with the first mold member.

5. The method of claim 1, further comprising moving the second mold section to a desired position and then releasing the contact lens therefrom.

6. An apparatus for separating a first mold section from a second mold section and a contact lens molded therein, where molding surfaces of the mold sections are in contact with surfaces of the contact lens, said apparatus comprising:

a support for a mold assembly comprised of said first and second mold sections and said contact lens; and clamps for applying radial forces to and around a peripheral region of the first mold section in a manner that the first mold section molding surface is first separated from the contact lens surface at the periphery thereof and then inwardly towards a central region thereof.

7. The apparatus of claim 6, wherein the first mold section is a posterior mold for molding a posterior lens surface and the second mold section is an anterior mold for molding an anterior lens surface.

* * * * *